(12) United States Patent
Brick et al.

(10) Patent No.: US 11,143,381 B2
(45) Date of Patent: Oct. 12, 2021

(54) OPTOELECTRONIC DEVICE COMPRISING A SCATTERING ELEMENT

(71) Applicant: OSRAM Opto Semiconductors GmbH, Regensburg (DE)

(72) Inventors: Peter Brick, Regensburg (DE); Hubert Halbritter, Dietfurt-Toeging (DE)

(73) Assignee: OSRAM OLED GmbH, Regensburg (DE)

( * ) Notice: Subject to any disclaimer, the term of this patent is extended or adjusted under 35 U.S.C. 154(b) by 199 days.

(21) Appl. No.: 16/328,699

(22) PCT Filed: Aug. 24, 2017

(86) PCT No.: PCT/EP2017/071327
§ 371 (c)(1),
(2) Date: Feb. 26, 2019

(87) PCT Pub. No.: WO2018/037076
PCT Pub. Date: Mar. 1, 2018

(65) Prior Publication Data
US 2019/0204608 A1    Jul. 4, 2019

(30) Foreign Application Priority Data

Aug. 26, 2016 (DE) .......................... 102016115918.2

(51) Int. Cl.
*F21V 5/04*         (2006.01)
*F21V 5/00*         (2018.01)
(Continued)

(52) U.S. Cl.
CPC .............. *F21V 5/043* (2013.01); *F21V 5/004* (2013.01); *F21V 5/008* (2013.01); *G02B 5/0215* (2013.01);
(Continued)

(58) Field of Classification Search
CPC .......... F21V 5/004; F21V 5/008; F21V 5/043; G02B 27/0927; G02B 27/0961;
(Continued)

(56) References Cited

U.S. PATENT DOCUMENTS

| 5,592,332 A * | 1/1997 | Nishio | ................ G02B 3/0031 |
| | | | 359/619 |
| 5,598,280 A * | 1/1997 | Nishio | ..................... F21V 5/04 |
| | | | 349/57 |

(Continued)

FOREIGN PATENT DOCUMENTS

| CN | 102207687 A | 10/2011 |
| DE | 102006013343 A1 | 9/2007 |

(Continued)

*Primary Examiner* — Tsion Tumebo
(74) *Attorney, Agent, or Firm* — Slater Matsil, LLP

(57) ABSTRACT

In an embodiment, an arrangement includes an optoelectronic device including a plurality of components configured to generate electromagnetic radiation, wherein the components are arranged in a grid having identical spacings and a scattering element for expanding a radiation region of the electromagnetic radiation of the device, the scattering element comprising a first layer having first linear structures, the first structures being arranged parallel to one another and a second layer having second linear structures, the second linear structures being aligned parallel to one another, wherein the first linear structures and the second linear structures are arranged at a predefined angle of between 1° and 179°, wherein the first linear structures and/or the second linear structures constitute wave peaks and wave valleys, wherein adjacent wave valleys and adjacent wave peaks constitute a periodic spacing, and wherein the periodic spacing deviates at most by 20% from a multiple of the periodic spacing of the components.

20 Claims, 6 Drawing Sheets

(51) Int. Cl.
*G02B 5/02* (2006.01)
*F21Y 105/10* (2016.01)
*F21Y 115/10* (2016.01)
*F21Y 115/30* (2016.01)

(52) U.S. Cl.
CPC ........ *G02B 5/0278* (2013.01); *F21Y 2105/10* (2016.08); *F21Y 2115/10* (2016.08); *F21Y 2115/30* (2016.08)

(58) Field of Classification Search
CPC .......................... G02B 27/0966; G02B 3/0068; G02B 5/0215; G02B 5/0278; F21Y 2105/10; F21Y 2115/10; F21Y 2115/30
See application file for complete search history.

(56) References Cited

U.S. PATENT DOCUMENTS

| | | | | |
|---|---|---|---|---|
| 5,919,551 A | * | 7/1999 | Cobb, Jr. | ................. G02B 5/00 359/530 |
| 7,330,315 B2 | * | 2/2008 | Nilsen | .................... G02B 5/045 359/619 |
| 7,530,721 B2 | * | 5/2009 | Mi | ................... B29D 11/00663 362/606 |
| 10,126,485 B2 | * | 11/2018 | Stevenson | ............ G02B 6/0051 |
| 10,191,203 B2 | * | 1/2019 | Cho | ....................... G02B 5/0231 |
| 2007/0085942 A1 | | 4/2007 | Guo et al. | |
| 2009/0284951 A1 | * | 11/2009 | Muschaweck | ..... G02B 27/0927 362/97.1 |
| 2011/0134648 A1 | | 6/2011 | Lin et al. | |
| 2014/0009836 A1 | | 1/2014 | Weber et al. | |
| 2014/0009838 A1 | | 1/2014 | Weber et al. | |
| 2015/0136226 A1 | * | 5/2015 | Guo | ..................... B23K 26/082 136/256 |
| 2017/0334170 A1 | * | 11/2017 | Haghdoost | ................ B32B 5/16 |
| 2019/0011841 A1 | * | 1/2019 | De Jager | ................ G03F 7/704 |

FOREIGN PATENT DOCUMENTS

| | | | | |
|---|---|---|---|---|
| EP | 2397750 A1 | | 12/2011 | |
| WO | WO-2017131585 A1 | * | 8/2017 | ............. G02B 27/20 |

* cited by examiner

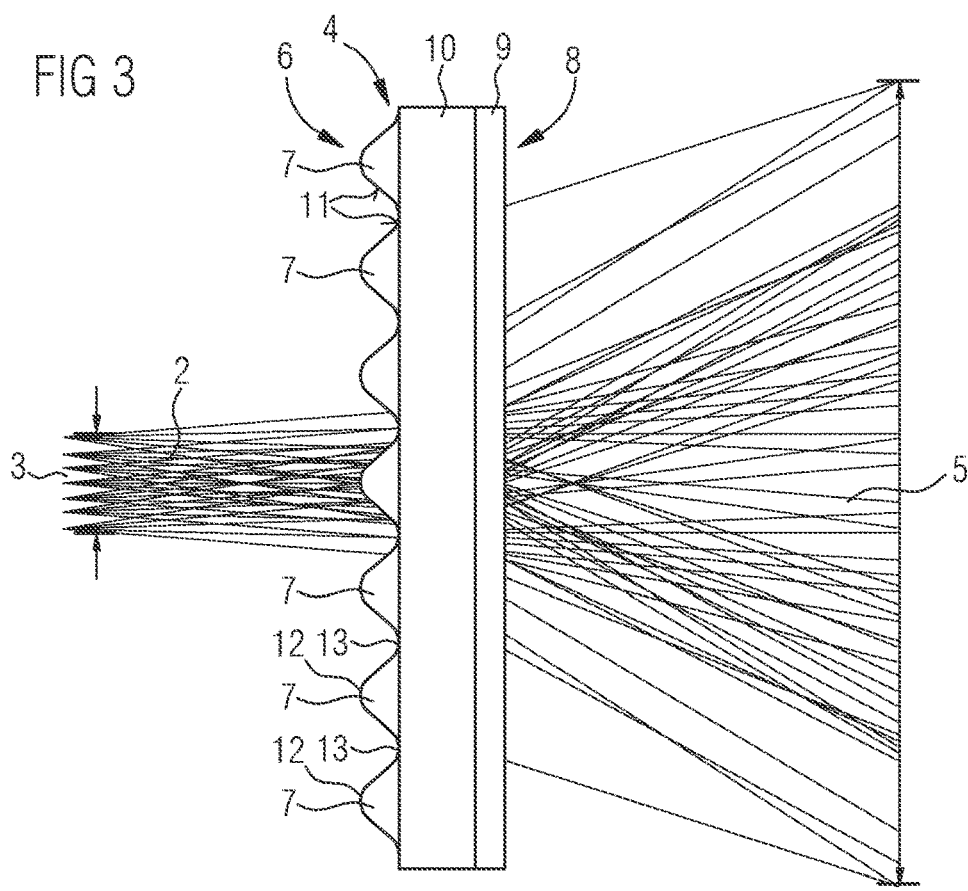
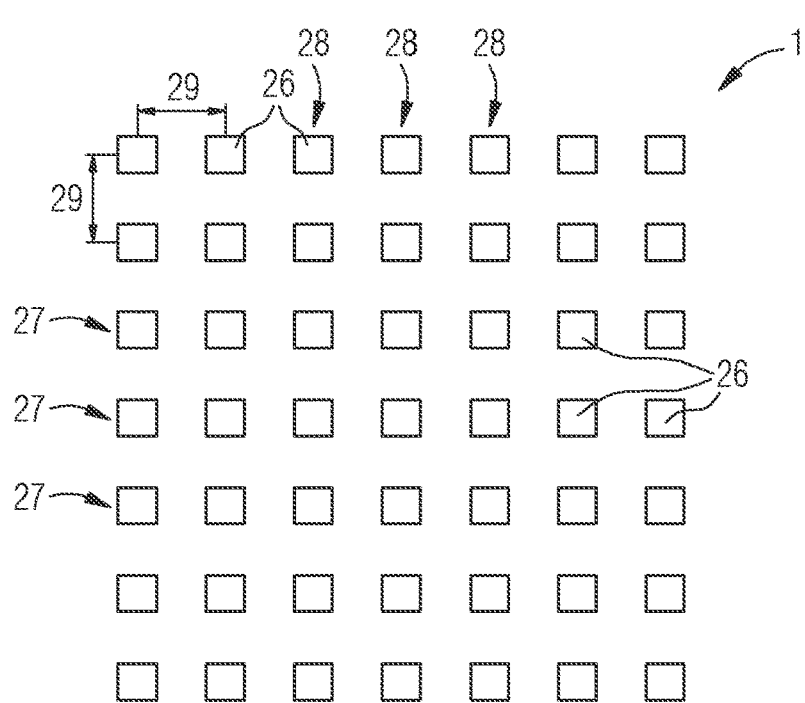

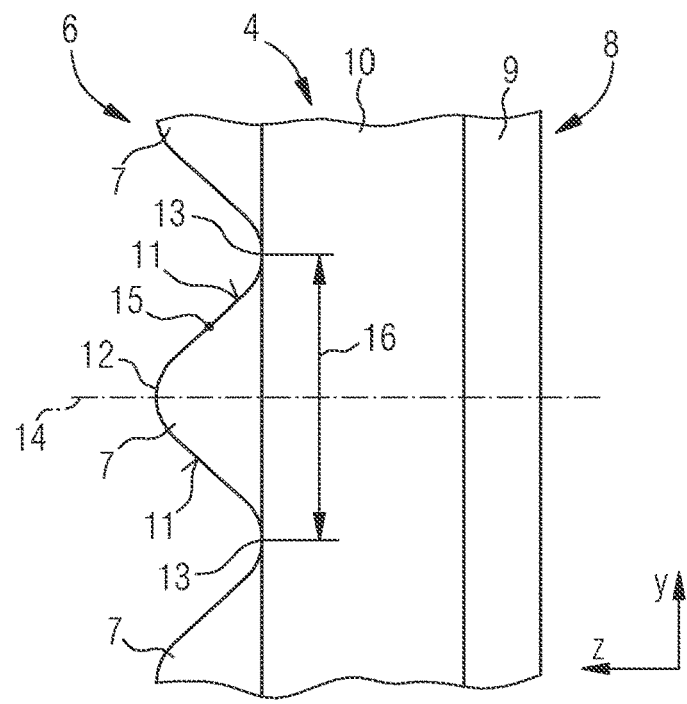
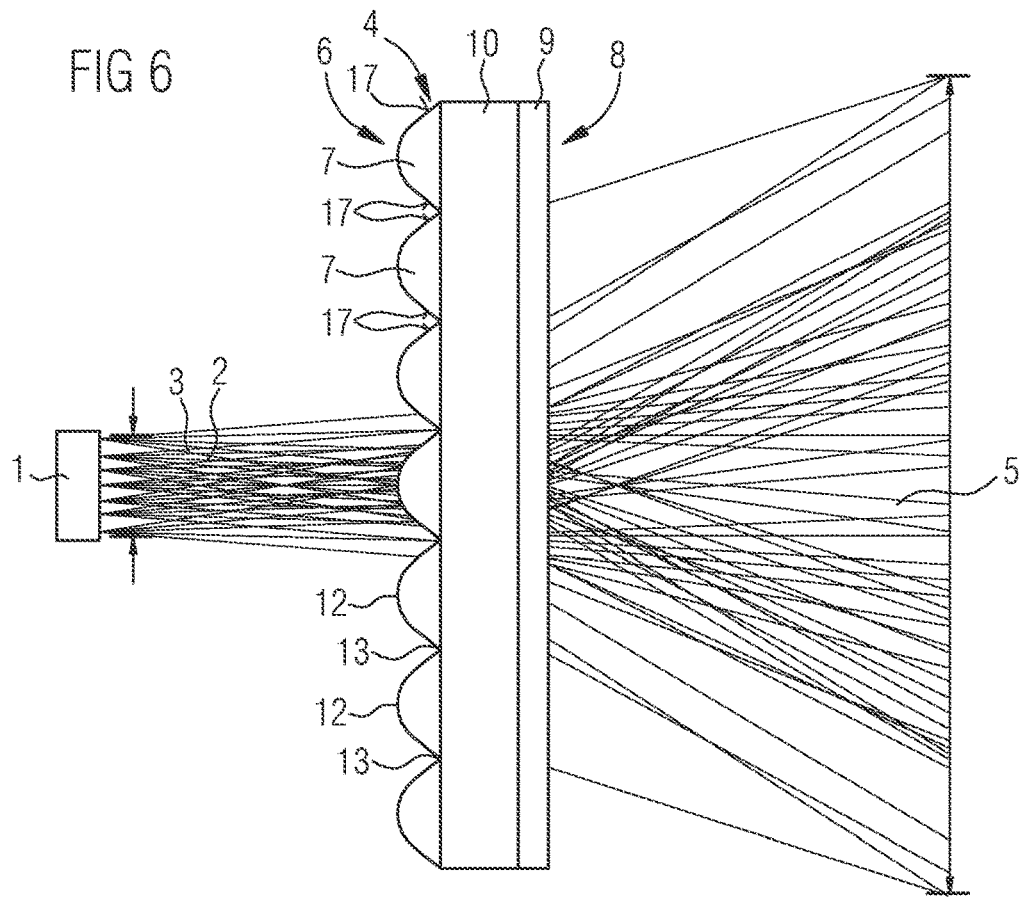

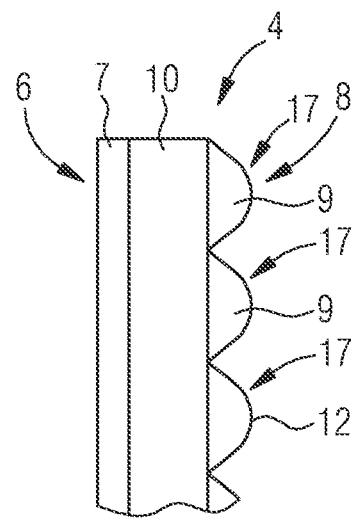
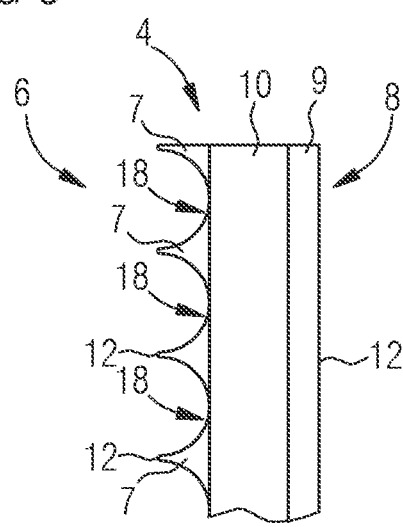
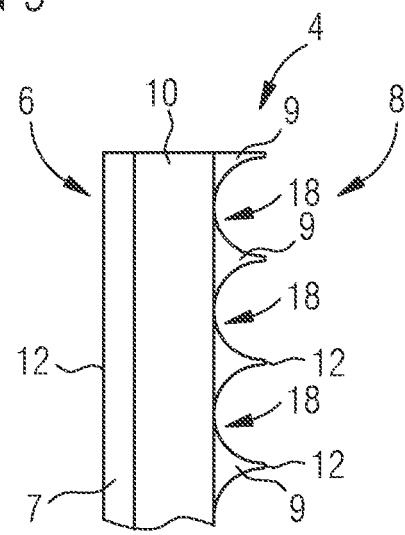

OPTOELECTRONIC DEVICE COMPRISING A SCATTERING ELEMENT

This patent application is a national phase filing under section 371 of PCT/EP2017/071327, filed Aug. 24, 2017, which claims the priority of German patent application 102016115918.2, filed Aug. 26, 2016, each of which is incorporated herein by reference in its entirety.

TECHNICAL FIELD

The invention relates to an optoelectronic device comprising a scattering element and to a scattering element.

BACKGROUND

DE 10 2009 056 385 A1 discloses providing a tertiary optical unit for an electromagnetic light source, which comprises a matrixlike arrangement of microlenses. The microlenses comprise widths of different magnitudes in the longitudinal direction and in the transverse direction. Especially along the longitudinal direction, adjacent microlenses may comprise a sinusoidal progression or else be separated from one another by sharp edges.

SUMMARY OF THE INVENTION

Embodiments provide an improved optoelectronic device comprising a scattering element for expanding the radiation region of the electromagnetic radiation. Moreover, embodiments provide an improved scattering element for expanding the radiation region of a light-emitting optoelectronic device.

One advantage of the device described is that expanding the radiation region of the electromagnetic radiation of the device is achieved with a scattering element constructed in a simple manner. The scattering element is insensitive to contamination and wetting of the scattering structures. This is achieved in particular by virtue of the fact that crossed linear structures are provided, which constitute scattering structures. The first linear structures of a first layer and the second linear structures of a second layer are arranged at a predefined angle of between 1° and 179° with respect to one another with regard to their linear structure. The first and the second linear structures thus cross one another at an angle of between 1° and 179°, that is to say that they are not arranged parallel to one another. In this way, using simple means it is possible to produce a scattering structure that enables the radiation region of the light-emitting device to be expanded efficiently.

The linear structures may comprise in particular a structure height that is greater than 10 μm. As a result, the linear structures are less susceptible to contamination and wetting. The linear structures may be produced in a simple manner. Consequently, with the aid of the proposed scattering element, it is possible to provide a simply producible alternative to diffractive optical elements comprising a structure size in the region of the wavelength of the electromagnetic radiation.

The device preferably comprises a plurality of radiation-emitting components. The components are arranged in a grid comprising a constant spacing between the components. Moreover, the linear structures comprising the wave peaks likewise constitute a grid comprising spacings of identical magnitude between the wave peaks. The spacings of the wave peaks deviate at most by 20% from a multiple of the spacings of the components. A uniform expansion of the radiation region is achieved as a result. The more accurately the spacings of the wave peaks match multiples of the spacings of the components, the more uniform an expansion of the electromagnetic radiation becomes.

In one embodiment, the first linear structures comprise a rounded first surface in cross section perpendicular to the longitudinal direction and the second linear structures comprise a rounded second surface perpendicular to the longitudinal direction. Rounded surfaces may be produced in a simple manner. Moreover, a good expansion of the radiation region of the device may be achieved with the aid of the rounded surfaces.

In a further embodiment, the first and/or the second surface of the first and/or the second structures, respectively, comprise(s) a wave shape in cross section perpendicular to the longitudinal direction of the linear first and/or second structures, respectively. A wave valley is formed here in each case between two linear structures of the first and of the second layer. The linear structures comprise a surface comprising a wave shape comprising wave peaks and wave valleys perpendicular to the longitudinal extent. The configuration of the linear structures with a wave shape leads to a uniform deflection of the electromagnetic radiation in a plane perpendicular to the longitudinal direction of the linear structures. A more uniform expansion of the radiation region of the electromagnetic radiation is achieved as a result.

In a further embodiment, the first and/or the second surface comprise(s) a juxtaposition of convex and/or of concave partial surfaces in cross section perpendicular to the longitudinal direction of the first and/or of the second linear structures, respectively. With this embodiment, too, it is possible to achieve a relatively uniform expansion of the radiation region and hence a relatively uniform expansion of the light power.

In a further embodiment, the first layer and the second layer are connected to one another via a connection layer. As a result, the integral scattering element may be mounted more easily on the device.

In a further embodiment, the first layer and the second layer are arranged at a predefined distance from one another.

In a further embodiment, the surfaces of the two layers comprising the linear structures are aligned in a common direction. In a further embodiment, the surfaces of the two layers comprising the linear structures are aligned in opposite directions. In this case, the surfaces of the two layers comprising the linear structures face away from a plane arranged between the layers.

In a further embodiment, the surfaces of the two layers comprising the first and the second linear structures are aligned in opposite directions, wherein the surfaces of the two layers comprising the linear structures are aligned with a plane arranged between the structures.

Depending on the embodiment chosen, at least one layer comprising linear structures is formed on a carrier. This results in an increased flexibility in the production of the scattering element. By way of example, the layer comprising the linear structures may be constituted from a different material than the carrier.

In a further embodiment, the two layers comprising the linear structures are mechanically connected to one another via at least one web. The at least one web may also be configured circumferentially in the form of a frame. Given a sufficient thickness of the layers and/or of the carriers of the layers, a connection of the two layers via webs may be sufficient for a required mechanical stability. Material may be saved as a result. Moreover, it is possible to use fast connection methods for connecting the two layers.

In one embodiment, the linear first structures and the linear second structures are arranged at an angle of 90° with respect to one another. A symmetrical grid of wave valleys and wave peaks comprising spacings of identical magnitude is obtained in this way. A uniform expansion of the radiation region is thus made possible.

In one embodiment, the device comprises a plurality of components configured to generate electromagnetic radiation, wherein the components are arranged in a grid comprising identical spacings, wherein the device extends over a predefined width and length, wherein the first and/or the second linear structures constitute wave peaks and wave valleys, wherein adjacent wave valleys and adjacent wave peaks constitute a periodic spacing, wherein the periodic spacing of the wave valleys and of the wave peaks deviates at most by 10% from an integer divisor, in particular from an even integer divisor, of the width and/or the length of the device.

A uniform expansion of the radiation region is achieved as a result. The more accurately the spacings of the wave peaks match multiples of the spacings of the components, the more uniform an expansion of the electromagnetic radiation becomes.

Furthermore, a scattering element for expanding the radiation region of the electromagnetic radiation of an optoelectronic device is provided, comprising a first layer comprising first linear structures, wherein the first structures are arranged parallel to one another. Moreover, the scattering element comprises a second layer comprising second linear structures, wherein the second structures are aligned parallel to one another. The first and the second structures are arranged at a predefined angle of between 1° and 179° with respect to one another. Consequently, the first and second linear structures are not arranged parallel to one another with regard to their longitudinal extent.

BRIEF DESCRIPTION OF THE DRAWINGS

The above-described properties, features and advantages of this invention and the way in which they are achieved will become clearer and more clearly understood in association with the following description of the exemplary embodiments that are explained in greater detail in association with the drawings. Here in a schematic illustration in each case:

FIG. 3 shows a cross section through the scattering element from FIGS. 1 and 2;

FIG. 4 shows a device comprising a plurality of components;

FIG. 5 shows an enlarged illustration of a cross section through the scattering element;

FIG. 6 shows a schematic cross section through a further scattering element;

FIG. 7 shows a further partial cross section through the scattering element from FIG. 6;

FIG. 8 shows a partial cross section through a scattering element comprising a first layer comprising concave partial surfaces;

FIG. 9 shows a partial cross section through a scattering element comprising a second layer comprising concave partial surfaces;

DETAILED DESCRIPTION OF ILLUSTRATIVE EMBODIMENTS

Figure 1:
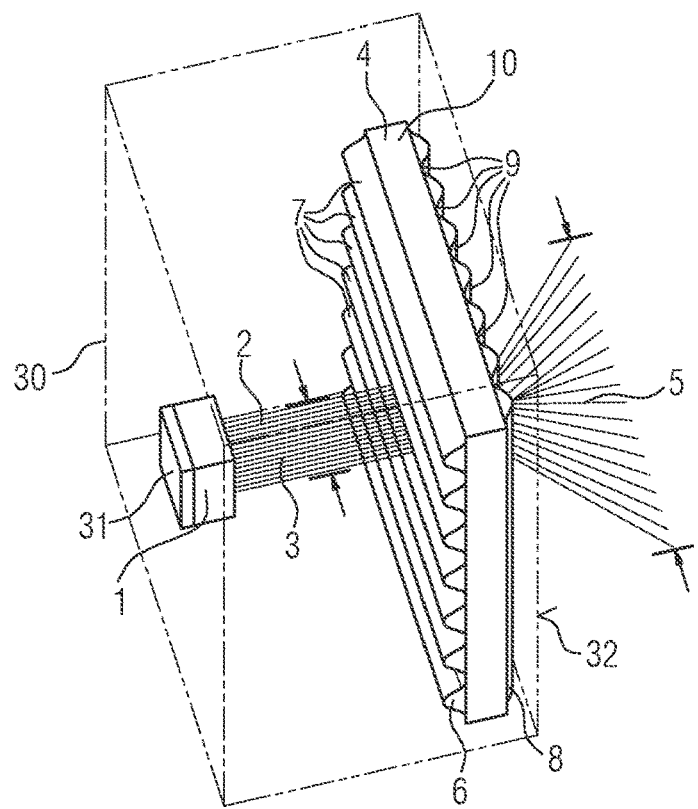
FIG. 1 shows a perspective illustration of an arrangement comprising a light-emitting device and a scattering element.

FIG. 1 shows a schematic illustration of a device 1 configured to emit electromagnetic radiation 2. The device 1 may comprise, for example, at least one laser, at least one laser diode, at least one superluminescence diode or a light-emitting diode. The electromagnetic radiation 2 may lie in the UV range, in the visible range or in the infrared range. Moreover, the electromagnetic radiation 2 may comprise such a high radiance that an eye of a human being may be damaged when looking into the electromagnetic radiation 2. The electromagnetic radiation 2 is emitted from the device 1 in a radiation region 3. A scattering element 4 is arranged in the radiation region 3, said scattering element expanding the radiation region 3 of the electromagnetic radiation 2 into a larger second radiation region 5. As a result, the radiance of the electromagnetic radiation 2 in the second radiation region 5 downstream of the scattering element 4 is reduced compared with the radiance in the radiation region 3 upstream of the scattering element 2. The radiation region 3 may comprise, for example, a square comprising an edge length of 120 μm. The second radiation region 5 may comprise, for example, a square comprising an edge length of 1 mm. A two-dimensional expansion of the radiation region 3 is thus achieved. The device 1 and the scattering element 4 are arranged, for example, in a housing 30, which, e.g., is hermetically closed and is at least partly constituted from a transparent material such as, e.g., glass. The housing 30 comprises a device carrier 31 for the device 1. Moreover, the housing 30 comprises a radiation side 32 for the electromagnetic radiation.

The scattering element 4 is thus provided for expanding the radiation region of the electromagnetic radiation of the device 1. The scattering element 4 comprises a first layer 6 comprising first linear structures 7. In the exemplary embodiment, the first linear structures are arranged parallel to one another. In the exemplary embodiment illustrated, the first layer 6 comprising the first linear structures 7 faces the device 1. Furthermore, the scattering element 4 comprises a second layer 8 comprising second linear structures 9. In the exemplary embodiment, the second linear structures 9 are arranged parallel to one another. The first and the second layer 6, 8 are arranged on a common carrier 10.

In the exemplary embodiment illustrated, the first linear structures 7 of the first layer 6 and the second linear structures 9 of the second layer 8 are arranged at an angle of 90° with respect to one another. Depending on the embodiment chosen, the first linear structures 7 and the second linear structures 9 may be arranged at an angle of between 1° and 179°. In the exemplary embodiment illustrated, the first and second linear structures 7, 9 are formed with rounded surfaces in cross section with respect to the longitudinal direction of the linear structures. Depending on the embodiment chosen, the first and/or second linear structures 7,9 may also comprise non-rounded surfaces, in particular angular, roughened, and structured surfaces, in cross section with respect to the longitudinal direction.

A basic function of the linear structures 7,9 is that elevations and depressions spaced apart from one another are arranged in the first and in the second layer 6, 8. In the exemplary embodiment illustrated, the linear first structures 7 of the first layer 6 comprise spacings from one another that are of identical magnitude. Depending on the embodiment chosen, the spacings of adjacent first structures 7 may also vary. Moreover, it is not absolutely necessary for the linear first structures 7 to be arranged in each case parallel to one another. Depending on the embodiment chosen, the spacings of adjacent second structures 9 may also vary. Moreover, it is not absolutely necessary for the linear second structures 9 to be arranged parallel to one another. By way of example, it is also possible to provide angle deviations from the parallel arrangement of the first and/or the second linear structures 7,9 in the range of a few angular degrees. Moreover, the linear first and/or second structures 7,9 may also be interrupted or comprise different heights in the longitudinal direction. Furthermore, the linear first and/or second structures 7,9 may also comprise deviations from a straight line structure and be configured in a curved fashion at least in sections. The scattering element 4 is constituted from a material configured to be substantially transmissive to the electromagnetic radiation 2 of the device 1.

As a result of the crossed arrangement of the first and second linear structures 7, 9, a double-sided lens array for expanding the radiation region of the electromagnetic radiation 2 is provided. The device 1 may comprise a plurality of light-emitting components. Light-emitting components may be arranged in a predefined grid comprising identical spacings of the grid points. By way of example, 7×7 components may be arranged with a grid spacing of 20 μm. The component or the device 1 may be configured as a surface emitting laser (VCSEL).

Figure 2:
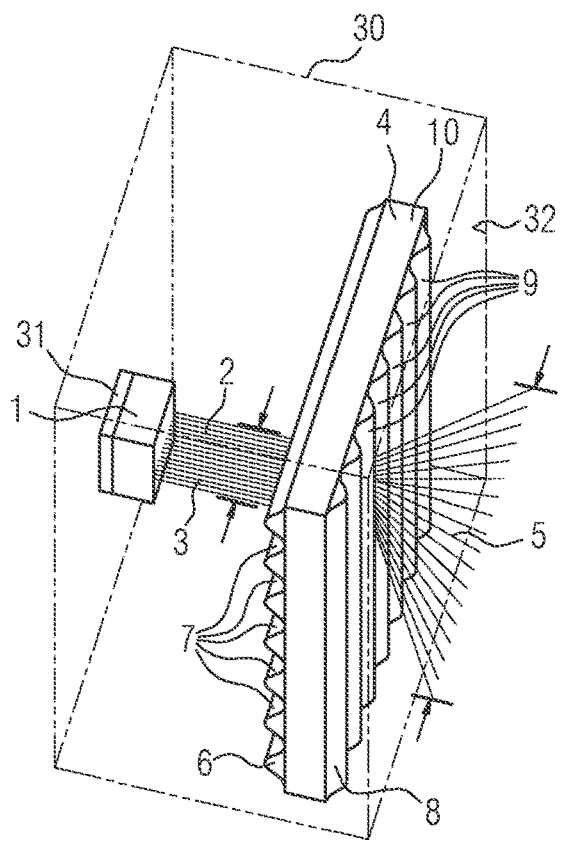
FIG. 2 shows a perspective illustration of the second layer of the scattering element from FIG. 1.

FIG. 2 shows a perspective illustration of the arrangement from FIG. 1 looking at the second layer 8. In the arrangement illustrated, the second linear structures 9 are arranged vertically. The first linear structures 7 of the first layer 6 are arranged vertically. The first and the second linear structures 7, 9 thus form an angle of 90° with respect to the respective longitudinal extent of the linear structures.

FIG. 3 shows an enlarged partial cross section of the scattering element 4 from FIGS. 1 and 2. The cross section is taken parallel to the longitudinal extent of a second linear structure 9. The first linear structures 7 comprise a rounded surface 11 in cross section perpendicular to the longitudinal extent. In the embodiment illustrated, the surface 11 is configured in a wavy fashion, wherein the first linear structures 7 constitute wave peaks. In a direction perpendicular to the longitudinal extent of the linear first structures 7, a respective wave valley 13 is arranged between two adjacent first linear structures 7. Consequently, wave peaks 12 and wave valleys 13 alternate in cross section with respect to the longitudinal extent of the first linear structures 7. The second linear structures 9 of the second layer 8 are constructed analogously, wherein the wave peaks 12 and wave valleys 13 of the second linear structures 9 are not illustrated on account of the sectional illustration chosen.

The wave shape of the surface 11 may comprise a sinusoidal shape. Preferably, the surface 11 of the first and/or of the second linear structures 7,9 of the first and of the second layer 6,8 comprises at least in sections or throughout a shape that may be described by the following formula: $z = a \cdot y^2 + b \cdot y^4$. In the exemplary embodiment illustrated, the wave shapes of the first and/or of the second linear structures 7,9 comprise a period of 140 μm. The device may comprise 7×7 light-emitting components with a grid spacing of 20 μm. With 140 μm the wave shapes of the first and of the second linear structures 7,9 comprise a multiple of the grid spacings of the light-emitting components. Depending on the embodiment chosen, the period of the wave shapes of the first linear structures 7 and/or of the second linear structures 9 may deviate from a multiple of the grid of the components to a tolerance of ±20%. The first linear structures 7 are aligned at least approximately parallel to the rows of the arrangement of the components of the device 1. The second linear structures 9 are aligned at least approximately parallel to the rows of the arrangement of the components of the device 1. The period of the wave shape of the first and/or of the second linear structures perpendicular to the longitudinal extent of the first and/or of the second linear structures, respectively, corresponds to a spacing between a midpoint of a wave valley 13 and a midpoint of an adjacent wave valley 13.

The device 1 may additionally comprise a plurality of components 26 configured to generate electromagnetic radiation 2, wherein the components are arranged in a grid comprising identical spacings 29, wherein the device extends over a predefined width. The width results from the number of components 26 and the spacings thereof. The device may comprise, e.g., 7×7 light-emitting components 26 with a grid spacing of 20 μm. Consequently, the width and length of the device are in each case 140 μm. The first and/or the second linear structures 7, 9 comprise wave peaks 12 and wave valleys 13, wherein adjacent wave valleys 13 and adjacent wave peaks 12 constitute a periodic and constant spacing. The periodic spacing of the wave valleys and of the wave peaks deviates at most by 10% from an integer divisor, in particular from an even integer divisor, of the width and/or the length of the device 1. Consequently, in the example with a length and width of 140 μm, the spacing of the wave valleys and wave peaks may comprise, e.g., 70 μm or 35 μm.

The wave peaks 12 of the first and/or of the second linear structures 7, 9 may comprise a height of greater than 10 μm relative to the wave valleys 13. By way of example, the wave peaks 12 of the first and/or of the second linear structures 7, 9 may comprise a height of 40 to 100 μm. Moreover, the wave peaks 12 of the first and of the second linear structures 7, 9 may also be of different sizes. By way of example, the wave peaks 13 of the second linear structures 9 may be smaller than the wave peaks 13 of the first linear structures 7. The carrier 10 may comprise, for example, a thickness of 100 μm.

FIG. 4 shows a schematic illustration of a device 1 comprising 7×7 radiation-emitting components 26. The components 26 are arranged in a grid in rows 27 and columns 28. The spacing 29 of adjacent rows 27 and of adjacent columns 28 is of identical magnitude and may comprise, e.g., 20 μm. The spacing of the rows and columns may also be smaller or larger. Moreover, the device 1 may also comprise fewer or more components 26.

FIG. 5 shows an enlarged illustration of a partial cross section through a scattering element 4, wherein the surface 11 of the first and/or of the second linear structures 7,9 of the first and of the second layer 6,8 may be described at least in sections or throughout by the following formula: $z=a\cdot y^2+b\cdot y^4$. A plane of symmetry 14 is formed here in each case through a center of a wave peak 12. The plane of symmetry 14 is depicted as a dashed line. In addition, a point of symmetry 15 is depicted schematically in the center between a wave peak 12 and a wave valley 13. The point of symmetry 15 indicates a midpoint for the wave shape of the surface 11. Moreover, the period 16 is illustrated schematically in the form of an arrow. The period 16 extends from a wave valley 13 to the adjacent wave valley 13.

The scattering element 4 may be constituted uniformly from one material. Moreover, the carrier 10 may be constituted from a different material like the first and/or the second layer 6, 8. Furthermore, the first layer 6 and the second layer 8 may also be constituted from different materials. Furthermore, the carrier 10 may be formed integrally with the first layer 6, wherein the second layer 8 is constituted from a different material. Moreover, the carrier 10 may be formed integrally with the second layer 8, wherein the first layer 6 is constituted from a different material. Furthermore, the carrier 10, the first layer 6 and/or the second layer 8 may in each case be produced separately and connected to one another.

FIG. 6 shows a cross section through a further embodiment of a scattering element 4, which expands electromagnetic radiation 2 of a device 1 from a radiation region 3 into a second radiation region 5. The size relationships are illustrated schematically. The scattering element 4 is configured substantially in accordance with the scattering element from FIGS. 1 to 3, but the surface 11 of the first linear structures 7 of the first layer 6 and/or the second linear structures 9 of the second layer 8 perpendicular to the longitudinal extent of the linear first and/or second structures 7,9, respectively, do not comprise sinusoidal wave shapes, but rather a juxtaposition of concave partial surfaces 17. The partial surfaces 17 each comprise the same shape. In an analogous manner, the second layer 8 in cross section perpendicular to the longitudinal extent of the second linear structure 9 may also comprise a juxtaposition of partial surfaces 17 which are curved outward and thus comprise convex identical shapes.

FIG. 7 shows a cross section through the arrangement from FIG. 6 perpendicular to the longitudinal extent of the second linear structure 9 and parallel through a wave peak 12 of a linear first structure 7 of the first layer 6. Consequently, the surface 11 of the second linear structures 9 of the second layer 8 also comprises a juxtaposition of concave partial surfaces 17 in cross section perpendicular to the longitudinal extent of the second linear structure 9. The wave peaks of the configuration of the surfaces ii of the first and/or of the second layer 6, 8 may likewise comprise heights in the range of from greater than 10 μm to 100 μm, for example. In particular, the wave peaks of the partial surfaces 17 of the second layer 8 may be configured to be smaller than the wave peaks of the partial surfaces 17 of the first layer 6.

FIG. 8 shows a schematic partial cross section through a further scattering element 4 through a wave peak of a second linear structure 9 of the second layer 8. The linear structures 7 of the first layer 6 comprise a juxtaposition of inwardly curved, i.e., concave, second partial surfaces 18 in cross section perpendicular to the longitudinal extent. The wave peaks 12 of the first linear structures 7 are configured such that they taper narrowly in the case of a concave configuration of the surface 11. In an analogous manner, the second linear structures 9 may also comprise a surface 11 in the form of a juxtaposition of second concave partial surfaces 18 in a cross section perpendicular to the longitudinal extent of the second linear structure 9. This embodiment is illustrated schematically in FIG. 9, wherein the cross section is taken along a wave peak 12 of a first linear structure 7. The wave peaks 12 of the first linear structures 7 are configured such that they taper narrowly in the case of a concave configuration of the surface 11.

Figure 10:
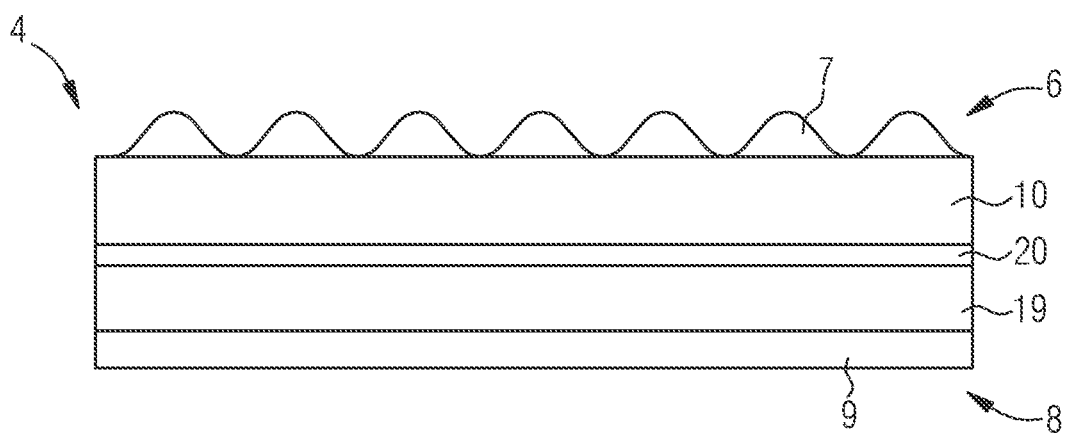
FIG. 10 shows a cross section through a scattering element comprising spaced apart layers, wherein the surfaces of the linear structures of the two layers face in opposite directions.

FIG. 10 shows a schematic partial cross section through a further embodiment of a scattering element 4 in which the first layer 6 is arranged on a carrier 10. In addition, a second carrier 19 is provided, on which the second layer 8 comprising the second linear structures 9 is arranged. The carrier 10 and the second carrier 19 lie one on top of the other, wherein the first and the second layer are arranged on opposite free sides of the respective carriers. Free side denotes that side of a carrier on which no linear structures are arranged and which is located opposite the side comprising the linear structures. The carrier 10 and the second carrier 19 are connected to one another via a connection layer 20, for example, an adhesive layer. The connection layer 20 may also be produced by a glass melt layer. In the exemplary embodiment illustrated, the first layer 6 and the second layer 8 are configured in accordance with the embodiment from FIG. 1. Depending on the embodiment chosen, the first layer 6 and/or the second layer 8 may also be configured as in FIGS. 4 to 9. Moreover, the connection layer 20 may be dispensed with and the first and the second carrier 10,19 may be arranged at a distance from one another.

Figure 11:
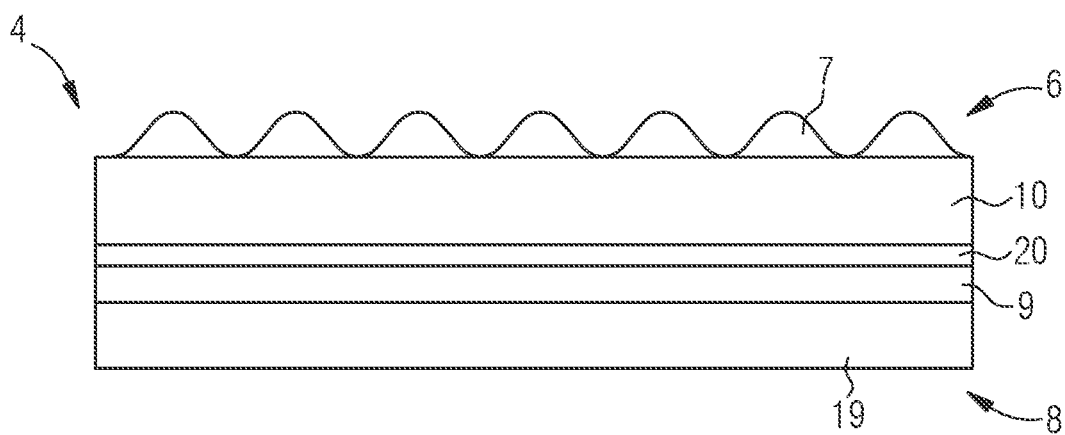
FIG. 11 shows a cross section through a further scattering element, wherein the surfaces of the linear structures of the two layers face in the same direction.

FIG. 11 shows, in a schematic partial cross section, a further embodiment of a scattering element 4 comprising a carrier 10 with a first layer 6 comprising linear first structures 7 and a second carrier 19 with a second layer 8 comprising second linear structures 9. In this embodiment, the second layer 8 faces a free side of the carrier 10. The first layer 6 is arranged opposite the free side of the carrier 10. The carrier 10 may be connected to the second carrier 19 via a connection layer 20. The connection layer 20 may be an adhesive layer that is applied on the second layer 8 and is connected to a free side of the carrier 10. Moreover, the connection layer 20 may be dispensed with and the first and the second carrier 10,19 may be arranged at a distance from one another.

Figure 12:
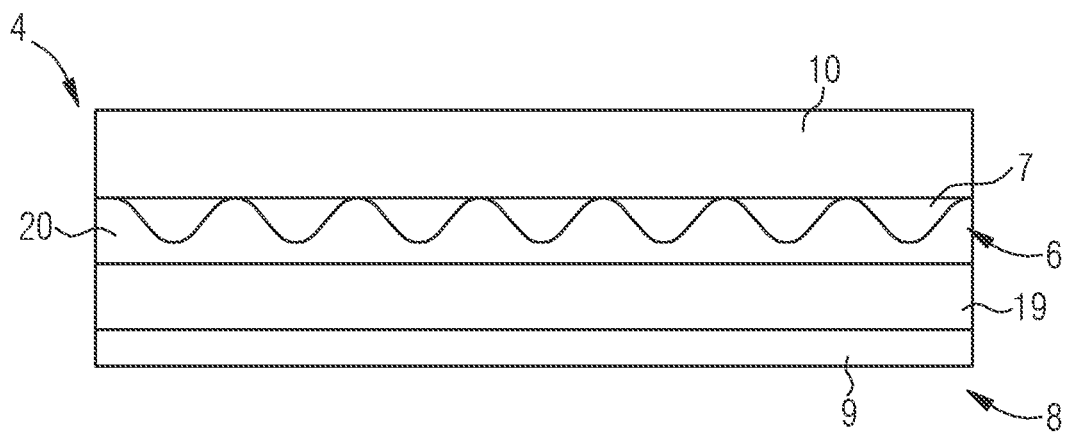
FIG. 12 shows a cross section through a further scattering element, wherein the surfaces of the linear structures of the two layers face in the same direction.

FIG. 12 shows a further embodiment of a scattering element 4 that is constructed substantially in accordance with the embodiment from FIG. 11, but in this embodiment the first layer 6 faces a free side of the second carrier 19 and is connected to the second carrier 19 via a connection layer 20.

Figure 13:
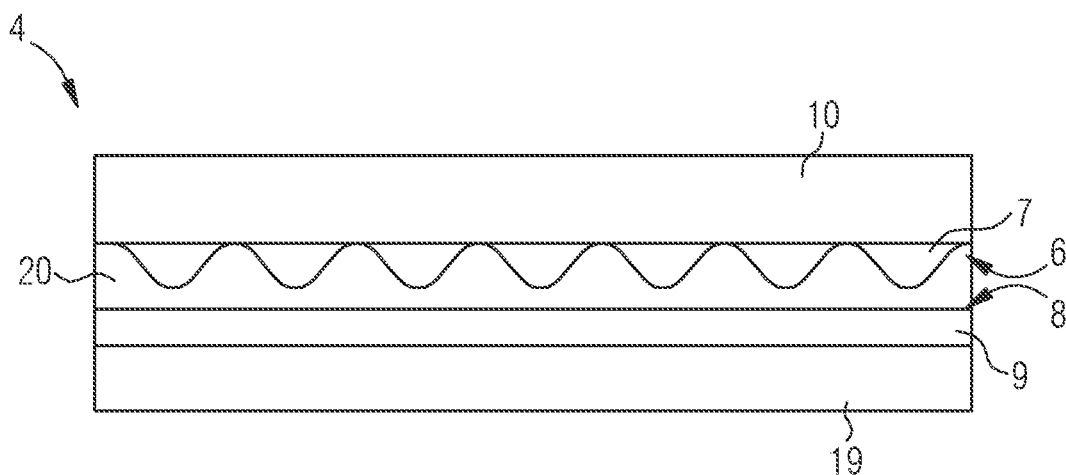
FIG. 13 shows a cross section through a scattering element in which the surfaces of the linear structures of the two layers face one another.

FIG. 13 shows a schematic partial cross section through a further embodiment of a scattering element 4 that is configured substantially in accordance with the embodiment from FIG. 11, but in this embodiment the first layer 6 and the second layer 8 face one another and are connected to one another via a connection layer 20. The connection layer 20 may be constituted, for example, as an adhesive layer, in particular comprising silicone. Moreover, the connection layer 20 may be dispensed with and the first and the second carrier 10,19 may be arranged at a distance from one another.

Figure 14:
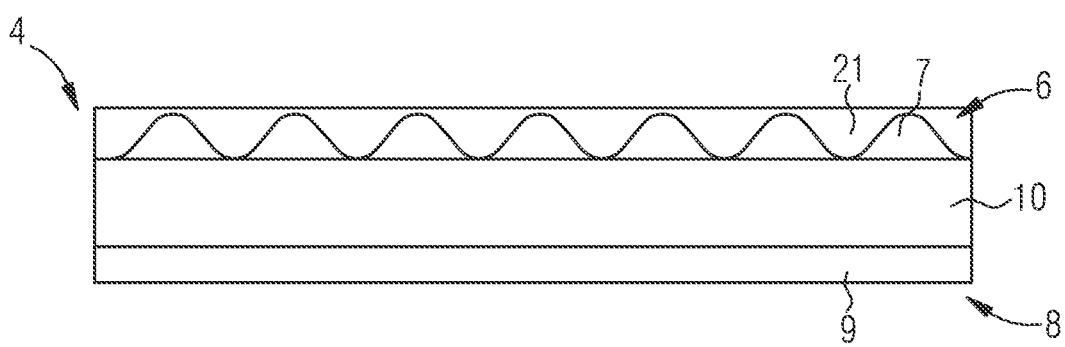
FIG. 14 shows a cross section through a first layer of the scattering element in which the linear structures are covered with a filling layer.

Depending on the embodiment chosen, in the case of the figures described, the surfaces of the linear structures 7,9 of the first and/or of the second layers 6, 8 may be filled with a filling layer 21, as is illustrated schematically for the first layer 6 in FIG. 14. The filling layer 21 provides for a planarization of the surface of the first layer 6. The filling layer 21 comprises, for example, a lower refractive index than the first layer 6. In an analogous manner, the surface of the second layer 8 may also be filled with a filling layer 21 and thus comprise a planar surface. The refractive index of the filling layer is chosen, for example, such that a reflection at an interface between the filling layer and the adjoining layer is small.

Figure 15:
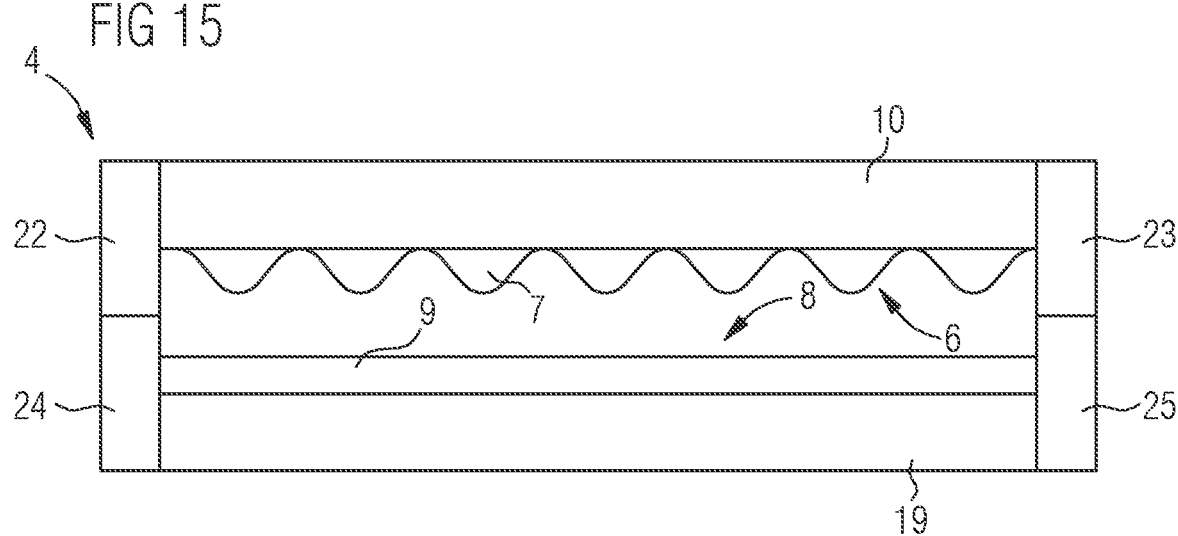
FIG. 15 shows a further embodiment of a scattering element in which the two layers are connected to one another via webs in the edge regions.

FIG. 15 shows a cross section through a further embodiment of a scattering element 4 that is configured substantially in accordance with the embodiment from FIG. 13, but in this embodiment the connection of the carrier 10 and of the second carrier 19 is not achieved via a connection layer, but rather via laterally arranged webs 22, 23, 24, 25. In this case, the carrier 10 comprises a first and a further first web 22, 23 at opposite side regions. Moreover, the second carrier 19 comprises a second and a further second web 24, 25 at opposite side regions. The first web 22 is connected to the second web 24 and the further first web 23 is connected to the further second web 25. The connection may be produced via an adhesive layer, via a low-temperature solder or via a glass melt connection. This type of connection structure may be used for any of the embodiments described above in order to connect the two carriers 10, 19 to one another. The webs 22, 23, 24, 25 consist of glass, for example. Depending on the embodiment chosen, the webs 22 to 25 may also consist of silicon. Depending on the embodiment chosen, provision may also be made of only one web for connecting the first and the second carrier 10,19. Moreover, the web may be configured circumferentially as a frame.

The carrier 10 and/or the second carrier 19 of the exemplary embodiments described may consist of glass or ceramic, for example. The first layer 6 comprising the linear first structures 7 and/or the second layer 8 comprising the second linear structures 9 may consist, for example, of a dielectric such as, for example, silicon nitride, silicon oxide or titanium oxide. The first and/or the second layer 6, 8 may be produced, for example, with the aid of a compression molding method.

The periodic arrangement of the linear structures 7,9 leads to a tolerant design vis à vis a lateral offset of the device relative to the scattering element. Linear structures may be produced more simply. When filling the linear structures with the aid of the filling material, plane optical elements are achieved which may be fitted and incorporated more simply. The linear structures comprising rounded surfaces may be readily molded and anticipate roundings that occur during production. On account of the larger structure dimensions, wherein the height and/or the spacing between wave peaks of the linear structures are/is greater than 10 μm, the arrangement is less susceptible to contamination and wetting.

The device 1 may comprise, e.g., a square area of 0.5 mm×0.5 mm to 1.0 mm×1.0 mm. Moreover, the device 1 may comprise, e.g., 50 to 120 components 26. The spacing of adjacent components of a device 1 may be, e.g., in the range of between 20 and 70 μm. A divergence of the electromagnetic radiation of the device may be in the region of 20°. A divergence of the electromagnetic radiation downstream of the scattering element may be in the region of 75°. A spacing between the device and the scattering element may be, e.g., in the range of between 0.15 mm and 0.6 mm.

The invention has been illustrated and described in greater detail on the basis of the preferred exemplary embodiments. Nevertheless, the invention is not restricted to the examples disclosed. Rather, other variations may be derived therefrom by the person skilled in the art, without departing from the scope of protection of the invention.

The invention claimed is:

1. An arrangement comprising:
   an optoelectronic device comprising a plurality of components configured to generate electromagnetic radiation, wherein the components are arranged in a grid comprising identical spacings; and
   a scattering element configured to expand a first radiation region of the electromagnetic radiation, wherein the scattering element is arranged in the first radiation region, the scattering element comprising:
      a first layer comprising first linear structures, the first structures being arranged parallel to one another; and
      a second layer comprising second linear structures, the second linear structures being aligned parallel to one another,
   wherein the first linear structures and the second linear structures are arranged at a predefined angle of between 1° and 179°,
   wherein the first linear structures and/or the second linear structures constitute wave peaks and wave valleys,
   wherein adjacent wave valleys and adjacent wave peaks constitute a periodic spacing,
   wherein the periodic spacing deviates at most by 20% from a multiple of the periodic spacing of the components,
   wherein the scattering element is configured to expand the first radiation region of the electromagnetic radiation into a larger second radiation region, and
   wherein a radiance of the electromagnetic radiation in the second radiation region downstream of the scattering element is reduced compared with a radiance in the first radiation region upstream of the scattering element.

2. The arrangement according to claim 1, wherein the first structures comprise rounded surfaces in cross section perpendicular to a longitudinal direction.

3. The arrangement according to claim 2, wherein each rounded surface comprise a wave shape, wherein a wave valley is formed between two linear structures perpendicular to the longitudinal direction of the linear structures, and wherein a linear structure constitutes a wave peak.

4. The arrangement according to claim 2, wherein the surfaces comprise juxtapositions of convex partial surface perpendicular to the longitudinal direction of the linear structures.

5. The arrangement according to claim 2, wherein the surfaces comprise juxtapositions of concave partial surfaces perpendicular to the longitudinal direction of the linear structures.

6. The arrangement according to claim 1, wherein the first layer and the second layer are connected to one another via a connection layer, and wherein the connection layer is a glass melt layer.

7. The arrangement according to claim 1, wherein the first and second layers are arranged on a carrier, wherein at least one layer comprising the linear structures is constituted from a different material than the carrier, and wherein the carrier consists of glass or ceramic.

8. The arrangement according to claim 1, wherein the first and second layers are connected to one another via at least one web.

9. The arrangement according to claim 1, wherein the device extends over a predefined width and length, wherein the first linear structures or the second linear structures constitute wave peaks and wave valleys, wherein adjacent wave valleys and adjacent wave peaks constitute a periodic spacing, and wherein the periodic spacing of the wave valleys or the wave peaks deviates at most by 10% from an integer divisor of the width or the length of the device.

10. The arrangement according to claim 1, wherein the device extends over a predefined width and length, wherein the first linear structures and the second linear structures constitute wave peaks and wave valleys, wherein adjacent wave valleys and adjacent wave peaks constitute a periodic spacing, and wherein the periodic spacing of the wave valleys and of the wave peaks deviates at most by 10% from an integer divisor of the width and the length of the device.

11. The arrangement according to claim 1, wherein the first and second layers comprising the linear structures are mechanically connected to one another via at least one web, and wherein the at least one web is arranged circumferentially around the first and second layers in form of a frame.

12. The arrangement according to claim 1, wherein the first layer is arranged on a first carrier, wherein the second layer is arranged on a second carrier, wherein the first carrier comprises a first web and a further first web at opposite side regions, wherein the second carrier comprises a second web and a further second web at opposite side regions, wherein the first web is connected to the second web, and wherein the further first web is connected to the further second web.

13. The arrangement according to claim 12, wherein the first web, the further first web, the second web and the further second web consist of glass, wherein the first web and the second web are connected by a glass melt connection, wherein the further first web and the further second web are connected by a glass melt connection and/or wherein the first web, the further first web, the second web and the further second web consist of silicon, wherein the first web and the second web are connected by a low-temperature solder, and wherein the further first web and the further second web are connected by a low-temperature solder.

14. The arrangement according to claim 1, wherein a surface of the first linear structures and/or of the second linear structures of the first and of the second layer is defined at least in sections or throughout by the following formula: $z=a\cdot y^2+b\cdot y^4$, wherein z defines a z-direction and y defines a y-direction, wherein the z-direction is perpendicular to the y-direction, wherein a point of symmetry for the surface of the first linear structures and/or of the second linear structures of the first and of the second layer is arranged in a center between a wave peak and a wave valley, and wherein the point of symmetry indicates a midpoint for a wave shape of the surface.

15. The arrangement according to claim 1, wherein the scattering element is configured to attain a relatively uniform expansion of light power in the second radiation region.

16. An arrangement comprising:
an optoelectronic device comprising a plurality of components configured to generate electromagnetic radiation, wherein the components are arranged in a grid comprising identical spacings, and wherein the device extends over a predefined width and length; and
a scattering element configured to expand a radiation region of the electromagnetic radiation, wherein the scattering element is arranged in the radiation region, the scattering element comprising:
a first layer comprising first linear structures, the first structures being arranged parallel to one another; and
a second layer comprising second linear structures, the second linear structures being aligned parallel to one another,
wherein the first linear structures and the second linear structures are arranged at a predefined angle of between 1° and 179°,
wherein the first linear structures and/or the second linear structures constitute wave peaks and wave valleys,
wherein adjacent wave valleys and adjacent wave peaks constitute a periodic spacing, and
wherein the periodic spacing of the wave valleys or of the wave peaks deviates at most by 10% from an integer divisor of the width or the length of the device.

17. An arrangement comprising:
an optoelectronic device comprising a plurality of components configured to generate electromagnetic radiation, wherein the components are arranged in a grid comprising identical spacings; and
a scattering element configured to expand a radiation region of the electromagnetic radiation, wherein the scattering element is arranged in the radiation region, the scattering element comprising:
a first layer comprising first linear structures, the first structures being arranged parallel to one another; and
a second layer comprising second linear structures, the second linear structures being aligned parallel to one another,
wherein the first linear structures and the second linear structures are arranged at a predefined angle of between 1° and 179°,
wherein the first linear structures and the second linear structures constitute wave peaks and wave valleys,
wherein adjacent wave valleys and adjacent wave peaks constitute a periodic spacing,
wherein the periodic spacing deviates at most by 20% from a multiple of the periodic spacing of the components, and
wherein wave peaks of the first linear structures and wave peaks of the second linear structures are directed to each other such that the wave peaks of the first linear structures and the wave peaks of the second linear structures delimit an intermediate space.

18. The arrangement according to claim 17, wherein the first layer is arranged on a first carrier, wherein the second layer is arranged on a second carrier, wherein the first carrier comprises a first web and a further first web at opposite side regions, wherein the second carrier comprises a second web and a further second web at opposite side regions, wherein the first web is connected to the second web, and wherein the further first web is connected to the further second web.

19. The arrangement of claim 18, wherein the first web, the further first web, the second web and the further second web consist of glass, wherein the first web and the second web are connected by a glass melt connection, and wherein the further first web and the further second web are connected by a glass melt connection.

20. The arrangement according to claim 17, wherein the first layer is arranged on a first carrier, wherein the second layer is arranged on a second carrier, wherein the first carrier is delimited by a first frame, wherein the second carrier is delimited by a second frame, and wherein the first and the second frame are connected.

* * * * *